(12) United States Patent
Vaidya et al.

(10) Patent No.: US 8,696,963 B2
(45) Date of Patent: Apr. 15, 2014

(54) FUNCTIONALLY GRADED SWELLABLE PACKERS

(75) Inventors: Nitin Y. Vaidya, Missouri City, TX (US); Evgeny Barmatov, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/545,051

(22) Filed: Jul. 10, 2012

(65) Prior Publication Data

US 2012/0273119 A1 Nov. 1, 2012

Related U.S. Application Data

(62) Division of application No. 12/622,558, filed on Nov. 20, 2009, now abandoned.

(51) Int. Cl.
*B29C 71/02* (2006.01)
*C08J 5/00* (2006.01)
*E21B 33/12* (2006.01)

(52) U.S. Cl.
USPC ... 264/236; 264/259; 264/271.1; 264/331.11; 166/387; 166/118

(58) Field of Classification Search
None
See application file for complete search history.

(56) References Cited

U.S. PATENT DOCUMENTS

| | | |
|---|---|---|
| 2,849,070 A | 8/1958 | Maly |
| 4,311,628 A | 1/1982 | Abdou-Sabet et al. |
| 4,981,912 A | 1/1991 | Kurihara |
| 5,100,947 A | 3/1992 | Puydak et al. |
| 5,157,081 A | 10/1992 | Puydak et al. |
| 7,059,415 B2 | 6/2006 | Bosma et al. |
| 7,373,991 B2 * | 5/2008 | Vaidya et al. ................. 166/381 |
| 7,665,537 B2 * | 2/2010 | Patel et al. .................... 166/387 |
| 7,665,538 B2 | 2/2010 | Robisson et al. |
| 7,687,571 B2 * | 3/2010 | Vaidya et al. ................. 524/543 |
| 7,938,191 B2 * | 5/2011 | Vaidya .......................... 166/387 |
| 8,235,108 B2 * | 8/2012 | Lemme et al. ................ 166/179 |
| 8,490,707 B2 * | 7/2013 | Robisson et al. ............. 166/387 |
| 8,499,843 B2 * | 8/2013 | Patel et al. .................... 166/387 |
| 2005/0004319 A1 | 1/2005 | Errasquin |
| 2005/0199401 A1 | 9/2005 | Patel et al. |
| 2006/0185849 A1 | 8/2006 | Edwards et al. |
| 2007/0027245 A1 | 2/2007 | Vaidya et al. |
| 2007/0056735 A1 | 3/2007 | Bosma et al. |
| 2008/0093086 A1 * | 4/2008 | Courville et al. ............. 166/378 |
| 2008/0194717 A1 * | 8/2008 | Vaidya et al. ................. 521/142 |
| 2008/0220991 A1 * | 9/2008 | Slay et al. ..................... 507/203 |
| 2008/0277109 A1 * | 11/2008 | Vaidya .......................... 166/118 |

(Continued)

FOREIGN PATENT DOCUMENTS

| | | |
|---|---|---|
| EP | 0283090 | 9/1988 |
| EP | 1672166 | 6/2006 |
| WO | WO0220941 | 3/2002 |
| WO | WO2005012686 | 2/2005 |

(Continued)

*Primary Examiner* — Benjamin Schiffman

(74) *Attorney, Agent, or Firm* — David J. Groesbeck; Brandon S. Clark

(57) ABSTRACT

A swellable packer including a tubular member and a swellable element. The tubular member is disposable on a mandrel configured to be deployed into a wellbore. The swellable element is disposed around the tubular member, and has segments of different cross link densities, with the segments configured to provide a varying cross link density in the swellable element along a thickness of the swellable element, an azimuth of the swellable element, or both.

20 Claims, 3 Drawing Sheets

(56) References Cited

U.S. PATENT DOCUMENTS

| | | |
|---|---|---|
| 2009/0084550 A1* | 4/2009 | Korte et al. .................... 166/294 |
| 2009/0139708 A1* | 6/2009 | Foster .......................... 166/118 |
| 2009/0211767 A1* | 8/2009 | Nutley et al. ................. 166/378 |
| 2009/0211770 A1* | 8/2009 | Nutley et al. ................. 166/387 |
| 2009/0229816 A1* | 9/2009 | Lemme et al. ................ 166/179 |
| 2009/0242189 A1* | 10/2009 | Vaidya et al. ................ 166/134 |
| 2009/0250228 A1* | 10/2009 | Loretz et al. ................. 166/387 |
| 2009/0277652 A1 | 11/2009 | Nutley et al. |
| 2010/0139929 A1* | 6/2010 | Rytlewski et al. ............ 166/387 |
| 2010/0139930 A1* | 6/2010 | Patel et al. .................... 166/387 |
| 2011/0253393 A1* | 10/2011 | Vaidya et al. ................ 166/387 |
| 2012/0175134 A1* | 7/2012 | Robisson et al. ............. 166/387 |

FOREIGN PATENT DOCUMENTS

| | | |
|---|---|---|
| WO | WO2005090741 | 9/2005 |
| WO | WO2005090743 | 9/2005 |
| WO | WO2005116394 | 12/2005 |
| WO | WO2006003112 | 1/2006 |
| WO | WO2006003113 | 1/2006 |
| WO | WO2006043829 | 4/2006 |
| WO | WO2006053986 | 5/2006 |
| WO | WO2006063988 | 6/2006 |
| WO | WO2006065144 | 6/2006 |
| WO | WO2006118470 | 11/2006 |
| WO | WO2006121340 | 11/2006 |
| WO | 2008155565 A1 | 12/2008 |

* cited by examiner

FUNCTIONALLY GRADED SWELLABLE PACKERS

CROSS-REFERENCE TO RELATED APPLICATIONS

This application is a divisional of U.S. patent application Ser. No. 12/622,558 entitled, "FUNCTIONALLY GRADED SWELLABLE PACKERS," which was filed on Nov. 20, 2009, and is hereby incorporated by reference in its entirety.

BACKGROUND

Hydrocarbons are produced from a wellbore that passes through one or more hydrocarbon producing formations. Swellable packers are often used to isolate sections of the wellbore from one another, particularly those sections adjacent different hydrocarbon producing formations. Control of the swellable packer's swell rate, swell percentage, and the relative hardness of the swellable element is critical to assure sufficient engagement with the wellbore wall, and thus efficient isolation of the desired sections of the wellbore.

A need exists, therefore, for swellable elements and methods for making swellable elements that have controlled swell rates and large swell percentages.

SUMMARY

Embodiments of the disclosure may provide an exemplary swellable packer, including a tubular member and a swellable element. The tubular member is disposable on a mandrel configured to be deployed into a wellbore. The swellable element is disposed around the tubular member, and has segments with different cross link densities, the segments configured to provide a varying cross link density in the swellable element along a thickness of the swellable element, an azimuth of the swellable element, or both.

Embodiments of the disclosure may also provide an exemplary method of making a swellable packer. The exemplary method may include forming a sheet of uncured elastomeric material, and wrapping the sheet about a mandrel. The exemplary method may also include curing the elastomeric material to form a swellable packer comprising a swellable element, and varying the cross link density along a thickness of the swellable element, along an azimuth of the swellable element, or both.

Embodiments of the disclosure may further provide an exemplary method of sealing an annulus of a wellbore. The exemplary method may include disposing a swellable packer in the wellbore, with the swellable packer comprising a swellable element having a varying cross link density through a least a portion thereof, wherein the cross link density varies along a thickness of the swellable element, an azimuth of the swellable element, or both. The exemplary method may also include exposing the swellable element to a downhole trigger, and swelling the swellable element into irregularities of the wellbore to provide a hermetic seal with the wellbore.

BRIEF DESCRIPTION OF THE DRAWINGS

So that the recited features can be understood in detail, a more particular description, briefly summarized above, may be had by reference to one or more embodiments, some of which are illustrated in the appended drawings. It is to be noted, however, that the appended drawings illustrate only typical embodiments and are therefore not to be considered limiting of its scope, for the invention may admit to other equally effective embodiments.

DETAILED DESCRIPTION

Figure 1:
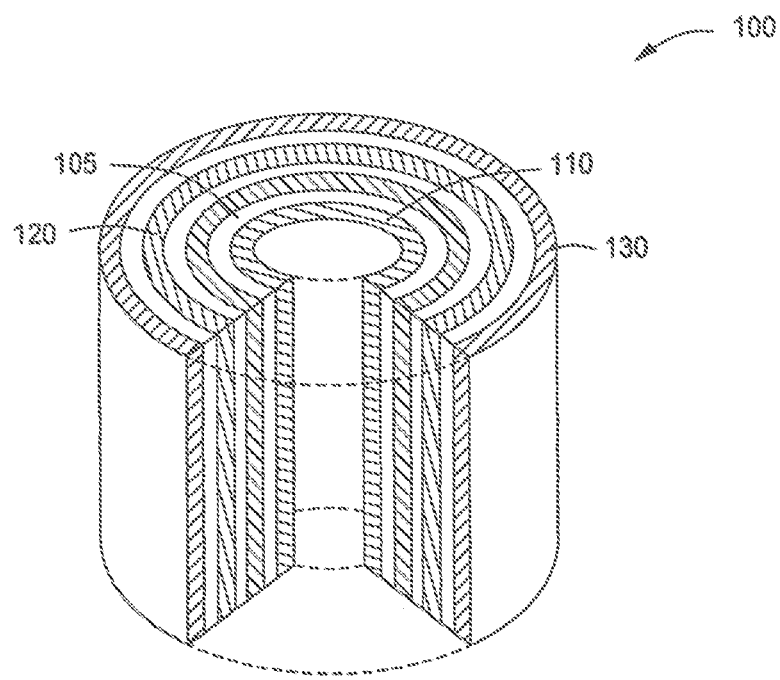
FIG. 1 depicts a cross sectional view of an illustrative swellable packer having a varying cross link density through the thickness thereof, according to one or more embodiments described.

FIG. 1 depicts an illustrative swellable packer 100 having a varying cross link density through the thickness thereof, according to one or more embodiments. The swellable packer 100 can include a tubular member 110 having a swellable element 105 disposed thereabout. The swellable element 105 can include one or a plurality of first segments 120 and one or a plurality of second segments 130. The first segments 120 of the swellable element 105 can have a first cross link density, and the second segments 130 can have a second cross link density. The segments 120, 130 can be layered parallel to the long axis of the tubular member 110, which provides the swellable element 105 having a cross link density varying about the thickness thereof. Though depicted in cylindrical form, swellable packer 100 can be of any shape so as to be adapted to the shape of a well bore into which it is to be disposed.

The tubular member 110 can be a downhole tubular such as blank pipe or a mandrel, which can be configured to be deployed into a wellbore. The tubular member 110 can also be configured to connect to one or more other downhole tubular members. Accordingly, the tubular member 110 can be incorporated into a completion string, a workstring, or another downhole string.

The swellable element 105 can be or include multiple layers of the segments 120, 130. The swellable element 105 can have from about 1 layer to about 140 layers of the first segment 120 and from about 1 layer to about 140 layers of the second segment 130. For example the first segment 120 can include about 1, about 5, about 10, about 15, about 20, about 25, about 30, about 40, about 50, about 75, about 100, about 125, or about 140 or more layers. The swellable element 105 can also have, for example, about 1, about 3, about 5, about 10, about 15, about 20, about 25, about 30, about 40, about 50, about 75, about 100, about 125, about 140 or more layers of the second segment. The number of layers of each segment 120, 130 can also range from a low of about 2, about 10, or about 20 to a high of about 50, about 80, about 90, about 120 or about 140.

The segments 120, 130 can be made from any elastomeric material. The elastomeric material of segments 120, 130 can be or include any polymeric or any other material that reacts with one or more triggers and expands or swells. The trigger may be any available device or physical parameter known to those of skill in the art to initiate the swelling or expansion of the elastic material, and may include one or more of the following: fluid, gas, temperature, pressure, pH, electric charge, or a chemical. Illustrative fluid triggers include water, hydrocarbons, treatment fluids, or any other fluid.

The elastomeric material used to make the segments 120, 130 can include material that will react with one or more triggers to volumetrically expand or otherwise swell. Non-limiting examples of materials that can be used to make at least a portion of the segments 120, 130 can include polyisoprene, polyisobutylene, polybutadiene, polystyrene, poly (styrene-butadiene), polychloroprene, polysiloxane, poly (ethylene-propylene), chorosulfonated polyethylene, and/or precursors, mixtures, or derivatives thereof. Examples of commercially available, suitable elastomeric copolymers are available under the tradenames VISTALON® (ExxonMobil Chemical Co.; Houston, Tex.), KELTAN® (DSM Copolymers), NORDEL® IP (Dow Chemical Company), NORDEL® MG (Dow Chemical Company), ROYALENE® (Chemtura) and Buna™ (Lanxess).

The elastomeric material of the segments 120, 130 can be cross linked using one or more cross linking agents known to those skilled in the art for processing cross linkable elastomer. Illustrative cross linking agents can include sulfur, silicon hydrides, phenolic resins, free radical initiators, zinc metal compounds, quinoids, or polyhalomethyl resins and the like. Many of these cross linking agents are frequently used with one or more coagents that serve as initiators, catalysts, etc. for purposes of improving the overall cure state of the elastomer. Such combinations of cross linking agents with cross linking catalysts and coagent(s) are often referred to as cross linking systems. Cross linking systems can contain sulfur, zinc oxide, stearic acid, a primary accelerator such as thiuram mono-, di- or tetrafulfides or metal salts of a dithiocarbamic acid, and a thiazole as a secondary accelerator. The cross linking agent may be disposed on the surface of the elastomeric material, uniformly or non-uniformly mixed within the elastomeric material, for instance by melt blending, or may be diffused through the elastomeric material by use of modificators.

Mechanical properties and swelling behaviour of an elastomer can depend on cross link density. The cross link density defines the mole fraction of monomer units which are crosslink points, or the number of cross linking bonds in a given volume or mass of the elastomeric material. The degree of cross linking in the elastomeric material of segments 120, 130 can be measured from swelling or mechanical measurements. For an additional description of cross juicing density, see *Engineering with Rubber—How to Design Rubber Components,* 2d edition, edited by Gent, Alan N. Hanser Publishers, 2001, the entirety of which is incorporated herein by reference to the extent not inconsistent with this disclosure.

An elastomer can absorb solvent and swell, sometimes highly, but does not typically dissolve. Swelling can continue until the retractive forces in the extended molecular strands in the network balance the forces tending to swell the network. For unfilled elastomers, the Flory-Rehner equation is widely used to relate the amount of swelling to the cross link density. The degree of cross-linking can also be calculated by determining the amount of the elastomeric material that is extractable by using cyclohexane or boiling xylene as an extractant. This method is disclosed in U.S. Pat. No. 4,311,628, the entirety of which is incorporated herein by reference to the extent not inconsistent with this disclosure. In one or more embodiments, the elastomeric material can have a degree of cure where not more than about 50 weight percent, not more than about 40 weight percent, not more than about 30 weight percent, not more than about 20 weight percent, not more than about 10 weight percent, not more than about 6 weight percent, not more than about 5 weight percent, or not more than about 3 weight percent is extractable by cyclohexane at 23° C. as described in U.S. Pat. Nos. 5,100,947 and 5,157,081, the entirety of both disclosures being incorporated herein by reference to the extent not inconsistent with this disclosure.

The cross link density of the first segment 120 may be the same or different from the cross link density of the second segment 130. Additionally, if multiple first segments 120 or second segments 130 are used, the cross link density of each individual segment of the multiple first segments 120 and/or second segments 130 may be the same or different. Differences in cross link density of segments 120, 130 or individual segments thereof may be achieved in any of a number of ways, including, but not limited to: (1) applying a higher concentration of the same cross linking agent to one or more segments 120, 130; (2) providing a stronger (more effective) cross linking agent to one or more segments 120, 130; (3) exposing one or more segments 120, 130 to a fixed temperature for a longer period of time than the other segments 120, 130; (4) exposing all of the segments 120, 130 to a temperature gradient; or (5) exposing one or more segments 120, 130 to a temperature greater than the others.

The first segment 120 can have a cross link density greater than that of the second segment 130. For instance, the first segment 120 can have a first cross link density. The first cross link density can be a molar crosslink density from about $1 \times 10^{-6}$ mole of crosslink per gram of polymer to about $1 \times 10^{4}$ mole of crosslink per gram of polymer. The second segment 130 can have a molar crosslink density from about $1 \times 10^{-6}$ mole of crosslink per gram of polymer to about $1 \times 10^{4}$ mole of crosslink per gram of polymer. The first cross link density can be about 1% to about 300%, including, but not limited to about 5%, about 10%, about 25%, about 50%, about 100%, about 150%, about 200% and about 250%, more than the second cross link density. For example, the first cross link density can be a molar crosslink density of about $1 \times 10^{-2}$ mole of crosslink per gram of polymer and the second cross link density can be a molar crosslink density of about $1 \times 10^{-4}$ mole of crosslink per gram of polymer. The difference in cross link density between the first segment 120 and second segment 130 can cause the first segment 120 to have a lower swell percentage and swell rate than the second segment 130.

The swell rate, or volumetric increase per unit time, of the first segment 120 and/or the second segment 130 can be from about 1 cubic foot per day to about 1,000 cubic feet per day. For example, the swell rate can be about 1 cubic foot per day, about 10 cubic feet per day, about 100 cubic feet per day, about 200 cubic feet per day, about 400 cubic feet per day, about 500 cubic feet per day, about 750 cubic feet per day, about 900 cubic feet per day or more. The swell rate of the second segment 130 can be about 1% to about 300%, including, but not limited to about 5%, about 10%, about 25%, about 50%, about 100%, about 150%, about 200% and about 250%, larger than the swell rate of the first segment 120. For example, the first segment 120 can have a swell rate of about 1 cubic foot per day and the second segment can have a swell rate of about 5 cubic feet per day.

The swell percentage, or percent increase in volume of a given mass of elastomeric material, of the first segment 120 and/or second segment 130 can be from less than about 1% to about 500%. For example, the swell percentage can be less than about 1%, about 1%, about 2%, about 4%, about 10%, about 100%, about 200%, about 300%, about 400%, or more than 400%. Accordingly, the segments 120, 130 can volumetrically swell, individually or collectively from 1 cubic foot to 1.5 cubic feet when exposed to a trigger. In an exemplary embodiment, the swell percentage of the second segment 130 can be greater than the swell percentage of the first segment 120. The difference between the swell percentages of the segments 120, 130 can be from about 1% to about 400%. In an exemplary embodiment, the first segment 120 can volumetrically swell from about 1 cubic foot to about 5 cubic feet, and the second segment 130 can volumetrically swell from about 1 cubic foot to about 10 cubic feet when exposed to a trigger.

The first and second segments 120, 130 can provide a swellable element 105 having strong mechanical properties, a controlled swelling rate, and a large swell percentage. For example, the strong mechanical properties can be provided by the first segment 120 having a first cross link density that is high relative to that of second segment 130. The strong mechanical properties can allow the swellable element 105 to remain intact even in harsh wellbore environments. The controlled swelling rate and large swell percentage of the swellable element 105 can be a result of the interaction of the segments 120, 130. For example, the first segment 120 can restrain the swell rate of the second segment 130, while allowing the second segment 120 to reach its full swell percentage. As such, the swellable element 105 can have a slow swell rate and a high swell percentage.

The swellable element 105 can have an overall swell percentage, which may be described as the percent increase in volume of the combination of all segments 120, 130 in the swellable element 105 of a given mass of the swellable element 105 that contains proportions of all segments 120, 130 equal to the whole of the swellable element 105, of less than about 1%, about 1%, about 2%, about 4%, about 10%, about 100%, about 200%, about 300%, about 400%, or more than 400%. The swellable element 105 can also have an overall swell rate that ranges from less than about 1 cubic foot per day to more than about 100 cubic feet per day. In an exemplary embodiment, the swellable element 105 can have an overall swell rate of about 5 cubic feet per day. In one or more embodiments, the swellable element 105 can increase in volume or swell from about 10% to about 200% in one day. The cross link densities of the segments 120, 130 can also be configured to provide a specific swell rate and swell percentage of the swellable element 105.

Figure 2:
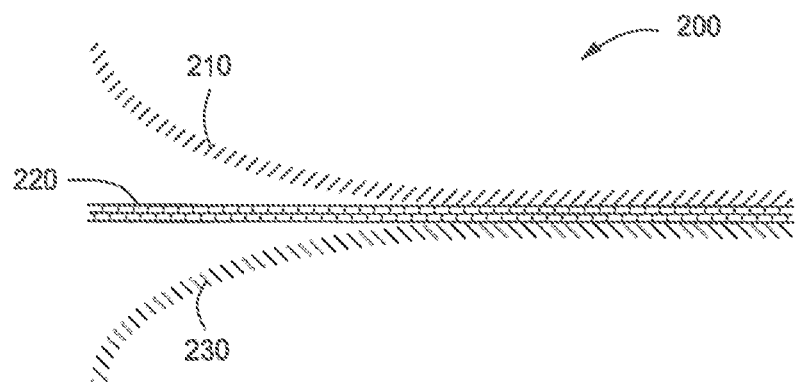
FIG. 2 depicts a cross sectional view of an illustrative elastomeric sheet having multiple layers of elastomeric material with different concentrations of cross linking agent, according to one or more embodiments described.

FIG. 2 depicts a cross-sectional view of an illustrative elastomeric sheet 290 having multiple layers 210, 220, 230 of elastomeric material with different concentrations of cross linking agent, according to one or more exemplary embodiments. The layers 210, 220, 230 of elastomeric material can be or include a polymeric material or any other material that expands when exposed to one or more downhole triggers.

The layers 210, 220, 230 can be made from the same material or different materials, and/or the concentrations of the cross linking agent can be different on each layer. As such, each layer 210, 220, 230 can have a different cross link density, in a similar manner as that described above with reference to FIG. 1 for the cross link densities of the segments 120, 130. The selection of material for each layer 210, 220, 230, the selection of cross linking agent, and the concentration of the cross linking agent in each layer can be predetermined to provide a specific cross link density to each layer 210, 220, 230. The cross link density of each layer 210, 220, 230 can be pre-selected based on the desired swell percentage and swell rate of each layer 210, 220, 230. The elastomeric sheet 200 can be extruded or calendared and wrapped about a tubular member, such as the tubular member 110 (FIG. 1).

The elastomeric sheet 200 can be cured by heating to provide a swellable element, such as swellable element 105, depicted in FIG. 1 and described above with reference thereto. For example, layer 210 can have a cross linking agent concentration of about 10 parts by weight per 100 parts by weight of elastomeric material, the second layer 220 can have a cross linking agent concentration of about 5 parts by weight per 100 parts by weight of elastomeric material, and the third layer 230 can have a cross linking agent concentration of about 3 parts by weight per 100 parts by weight of elastomeric material. After the sheet 200 is formed, the sheet 200 can be disposed about a tubular member (not shown) so that a layer, such as third layer 230, is adjacent the tubular member. The sheet 200 can be cured by heating after the sheet 200 is wrapped about the tubular member to provide a swellable element. In an exemplary embodiment, the resulting swellable element can have a cross link density that is highest about the outer diameter of the swellable element and lowest about the inner diameter of the swellable element. Accordingly, the resulting swellable element can have a cross link density varying along the radius, or cross-section, thereof.

The cross linking agent concentration of each layer 210, 220, 230 can be selected to provide a swellable element with a cross link density that varies as a linear function or nonlinear function after curing. In various exemplary embodiments, the cross link density can vary as a non-linear function, such as a polynomial, logarithmic, or trigonometric, or like function. For example, if a three layer elastomeric sheet is used with a single cross linking agent, having an activity proportionate to the mass of the agent present, the mass of cross linking agent may be made about 25% greater in layer n+1 than in layer n and about 25% greater in layer n+2 than in layer n+1. This would represent a cross link mass that varies by the nonlinear function $y=x(1.25)^{n-1}$ where n=the layer number, x=the mass of the cross linking agent in the first layer, and y=the mass of cross linking agent in layer n.

In one or more embodiments, the cross linking agent concentration of each layer 210, 220, 230 can be selected to provide a swellable element with a cross link density that varies chaotically or randomly (i.e., not according to a predetermined function). For example, each layer 210, 220, 230 can be blended and then cured with granules containing cross linking agents with certain release profiles. Granulated cross linking agents can be solid or encapsulated cross linking material. In an exemplary embodiment employing encapsulated cross linking material, the release profile of the cross linking agent can be controlled by varying the diffusion rate of the cross linking material through capsule shell, for example, by using different coating materials and shell thicknesses. The release profile can also be controlled by the dissolution speed of solid cross linking substances in the elastomer matrix. The cross linking density of the resulting elastomer can vary in the area contiguous to the grain according to the distance from the granule.

In one or more embodiments, the cross linking agent concentration of each layer 210, 220, 230 can also be varied along the length thereof. For example, the first layer 210 can have a cross linking agent concentration that is about 4 parts per centimeter of elastomeric material at one end thereof and reduces to about 1 part by weight per 100 parts by weight of elastomeric material at the opposite end thereof. Further, the second layer 220 can have a cross linking agent concentration that is about 8 parts by weight per 100 parts by weight of elastomeric material at one end thereof and reduces to about 5 parts by weight per 100 parts by weight of elastomeric material at the opposite end thereof; and the third layer 230 can have a cross linking agent concentration that is about 10 parts by weight per 100 parts by weight of elastomeric material at one end thereof and reduces to about 5 parts by weight per 100 parts by weight of elastomeric material at the opposite end thereof.

The sheet 200 can be wrapped around the tubular member such that a layer, for example, the third layer 230, is adjacent the tubular member and the sheet 200 can be cured by use of a cure agent and application of heat to provide a swellable element. The provided swellable element can have a cross link density that varies from the inner diameter thereof to the outer diameter, its length, an azimuth or a combination thereof. It will be appreciated that the thickness or inner diameter to outer diameter distance may be described as the radius if the swellable element is of cylindrical or similar shape and the length of the element may be described as a special case wherein the length is actually an azimuth where the radial distance is zero. In one or more embodiments, the layers 210, 220, 230 can be adapted to provide a swellable element after curing that has a cross link density that only varies about an azimuth thereof. For example, the layers 210, 220, 230 can each have a cross linking agent concentration that is about 10 parts by weight per 100 parts by weight of elastomeric material at a point thereon and reduces along a path that does not follow the radial or long axis thereof to about 5 parts by weight per 100 parts by weight of elastomeric material.

In one or more embodiments, a cross link density gradient can be formed in a swellable element, such as swellable element 105, by diffusing cross linking agent and modificators into a swellable element composed of polymeric materials and curing the polymeric material. When two or more polymeric materials are used to form the segments or layers of the swellable element, use of such techniques can result in interpenetrating polymer networks (IPNs). IPNs may be described as a polymer blend where the two or more polymers form interlocking networks, and may be characterized by (1) the two or more polymers being synthesized and/or crosslinked in the presence of the other(s), (2) the two or more polymers having similar kinetics, and (3) the two or more polymers not being dramatically phase separated.

In one or more embodiments, the cross link density of a swellable element can be varied by providing thermal energy to an elastomeric material disposed about a tubular member. In one or more embodiments, the sheet 200 can be cured by providing transient thermal energy thereto. For example, the sheet 200 can be disposed about the tubular member and cured by providing the transient thermal energy thereto. The sheet 200 can develop additional or intensified cross link density gradients throughout the resulting swellable element.

The additional or intensified cross link density gradients are caused by the uneven heating of the sheet 200. The uneven heating causes the additional temperature gradients because the half life period of cross linking agents increases as the temperature increases. The transient thermal energy can be provided about an azimuth and/or through the thickness of the sheet 200. Accordingly, the additional cross link density gradients can be formed about the azimuth and/or the through the thickness of the resulting swellable element. The transient thermal energy can be provided to the sheet 200 by heating the sheet 200 or a portion of the sheet 200 to a temperature from about 400° F. to about 500° F. in heating intervals of about 1 minute to about 3 minutes. The sheet 200 can be allowed to cool between heating intervals for about 5 minutes to about 20 minutes.

In one or more embodiments, the layers 210, 220, 230 of the sheet 200 can have a different concentration of cross linking agent and/or different cross linking agent compositions. For example, the layers 210, 220, 230 can have a cross linking agent concentration of about 1 part by weight per 100 parts by weight of elastomeric material, but the cross linking agent on the first layer can have about 90 wt % active cross linking component, such as sulfur, the cross linking agent on the second layer can have about 80 wt % active cross linking component, and the cross linking agent on the third layer can have about 50 wt % active cross linking component. The layers 210, 220, 230 can develop different cross link densities during curing due to the differing compositions of cross linking agent applied to each layer 210, 220, 230. Accordingly, a swellable element having a varying cross link density from the inner diameter to the outer diameter thereof can be provided. Furthermore, in one or more embodiments, an elastomeric material having an even concentration of cross linking agent can be cured by providing transient thermal energy thereto to provide a swellable element having a cross link density gradient through the thickness or about the azimuth thereof.

Figure 3:
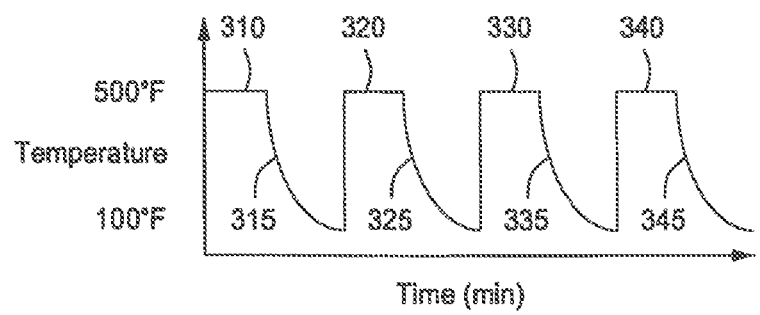
FIG. 3 depicts a graphical representation of an illustrative heating cycle that provides a swellable element that has a varying cross link density, according to one or more embodiments.

FIG. 3 depicts a graphical representation of an illustrative heating cycle that provides a swellable element that has a varying cross link density, according to one or more embodiments. In the exemplary embodiment, a sheet of elastomeric material having a constant cross linking agent concentration and cross linking agent composition can be wrapped around a tubular member. For example, the inner diameter of the sheet of elastomeric material can be about 5.5" and the outer diameter of the sheet of elastomeric material can be about 8.5" when placed about the tubular member. The sheet of elastomeric material can have transient thermal energy provided thereto during the curing by exposing the sheet of elastomeric material to an increased temperature in one or more heating periods (four are shown 310, 320, 330, 340) and cooling the sheet of elastomeric material in one are more cooling periods (four are shown 315, 325, 335, 345).

The sheet of elastomeric material can be exposed to a temperature of about 500° F. for 2 minutes during the first heating period 310. The sheet of elastomeric material can be gradually cooled to about 100° F. in the first cooling period 315. The first cooling period can be from about five minutes to ten minutes. The sheet of elastomeric material can be heated to a temperature of about 500° F. for about 2 minutes during the first heating period 320. The sheet of elastomeric material can be gradually cooled to about 100° F. in the second cooling period 320. The second cooling period can be from about five minutes to about ten minutes. The heating periods 330, 340 can be substantially similar to the first heating period 310, and the cooling periods 335, 345 can be substantially similar to the first cooling period 315. It will be appreciated that the foregoing heating and cooling temperatures and durations are merely exemplary, as are the number of heating and cooling periods, and the sheet of elastomeric material can be exposed to more or less heating and cooling periods of variable temperature and duration to provide a desired minimum cross link density without departing from the scope of this disclosure.

The transient heating of the sheet of elastomeric material can provide a swellable element having a cross link density gradient through the thickness thereof. In one or more embodiments, a cross link density about an azimuth can be provided by providing transient heat about that azimuth of the sheet of elastomeric material. For example, a sheet of elastomeric material can be disposed about a tubular member, a portion of the azimuth of the sheet elastomeric material disposed about the tubular member can be exposed to thermal energy at a first intensity and another portion of the azimuth of the sheet elastomeric material disposed about the tubular member can be exposed to a thermal energy of a second intensity. As such, the uneven temperatures of the different portions along the azimuth of the sheet elastomeric material disposed about the tubular member can provide a swellable element having a temperature gradient about that azimuth.

Figure 4:
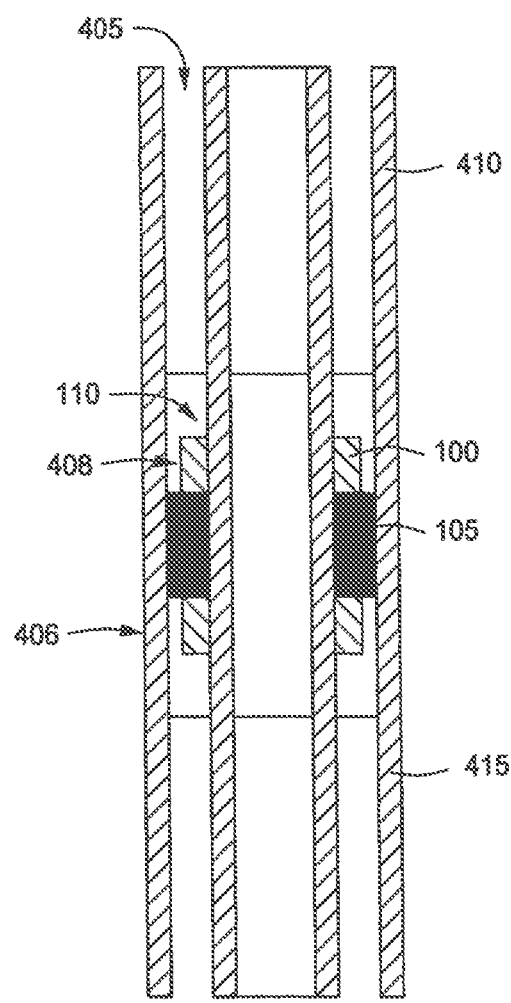
FIG. 4 depicts a cross-section of a wellbore with an illustrative swellable packer disposed therein, according to one or more embodiments described.

FIG. 4 depicts the swellable packer 100 disposed within (i.e., deployed into) a wellbore 405, according to one or more embodiments. The tubular member 110 of the swellable packer can be secured to an "upper" or first completion 410 and a "lower" or second completion 415, it being appreciated that the wellbore 405 can be vertical, as shown, deviated, or horizontal. The completions 410, 415 can be sand control, treatment, injection, or other types of completions. The wellbore 405 can be an open hole wellbore, as depicted, or a cased wellbore.

The swellable packer 100 and the completions 410, 415 can be conveyed into and located within the wellbore 405. As the swellable packer 100 is conveyed into the wellbore 405, the swellable element 105 can be exposed to a downhole trigger, such as hydrocarbons or fluids. The swellable element 105 can expand when exposed to the downhole trigger. The swellable element 105 can partially seal an annulus 408 formed between a wall 406 of the wellbore 405 and the swellable packer 100. The portion of the swellable element 105 having the lowest cross link density and the highest swell percentage can swell into the defects of the wall 406, and the portion of the swellable element 105 having the highest cross link density and lowest swell percentage can provide a strong hermetic seal.

Figure 5:
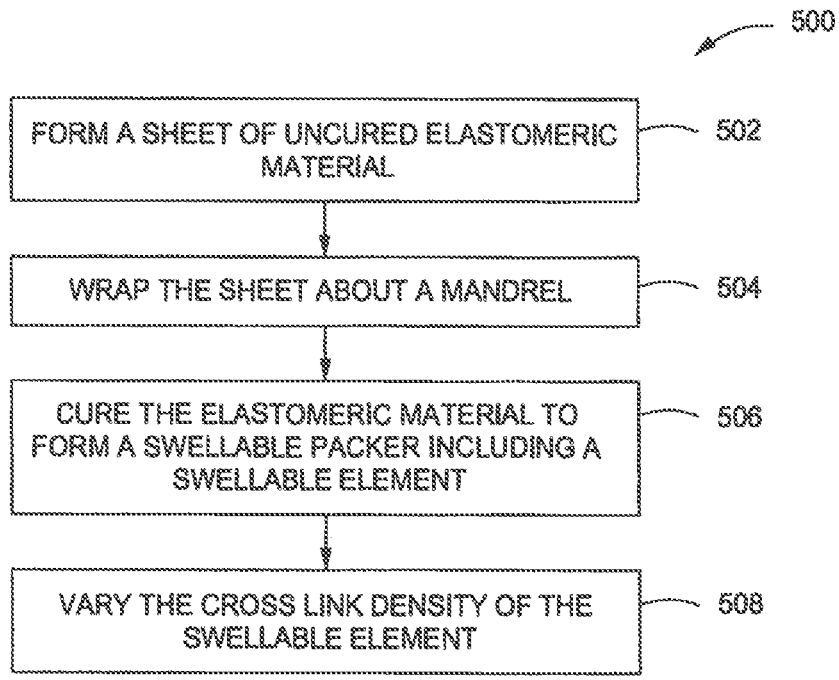
FIG. 5 depicts a flow chart of an exemplary method of making a swellable packer, according to one or more embodiments described.

FIG. 5 depicts a flow chart of an exemplary method 500 of making a swellable packer. The method 500 may include forming a sheet of uncured elastomeric material, as at 502. According to an exemplary embodiment of the method 500, the sheet may then be wrapped about a mandrel, as at 504. The uncured elastomeric material may be cured to form a swellable packer, which may include a swellable element, as at 506.

Furthermore, the method 500 may include varying the cross link density of the swellable, element, as at 508. In one or more exemplary embodiments, varying the cross link density may include providing transient thermal energy to the sheet during curing, as described above with reference to FIGS. 2 and 3. For example, the transient thermal energy may be provided in heating intervals from about 1 to about 2 minutes, but in other examples the heating intervals may be longer or shorter. The sheet may also be cooled between the heating intervals for a time period from about 5 minutes to about 20 minutes, according to the cooling temperature and desired temperature of the cooled sheet. In another exemplary embodiment, the cross link density may be varied by varying the composition or concentration of cross linking agent disposed in the sheet, for example, as described above with reference to FIG. 2.

In an exemplary embodiment, during, or prior to the curing at 506, the uncured elastomeric material may be blended with granules of cross linking agent. For example, granules of cross linking agent may be blended into the elastomeric material such that, after curing, the cross link density varies as a function of distance from each granule. In one or more embodiments, the granules may be encapsulated with shells. To vary the cross link density as a function of the distance from each granule, a thickness of the shells can be varied from granule to granule, resulting in varied release profiles of the granules during curing, as described above with reference to FIG. 2. Alternatively, or additionally, the coating material applied to, or making up, the shells may be varied to alter the diffusion rates of the cross linking agent therethrough, thus producing a varied release profile of the granules.

In one or more exemplary embodiments, the cross link density can instead or additionally increase from an inner diameter of the swellable packer to an outer diameter thereof. For example, the cross link density can vary linearly or non-linearly, such as according to trigonomic, transcendental, exponential, or other functions, as described above with reference to FIG. 3. In an exemplary embodiment, the cross link density can vary chaotically.

Figure 6:
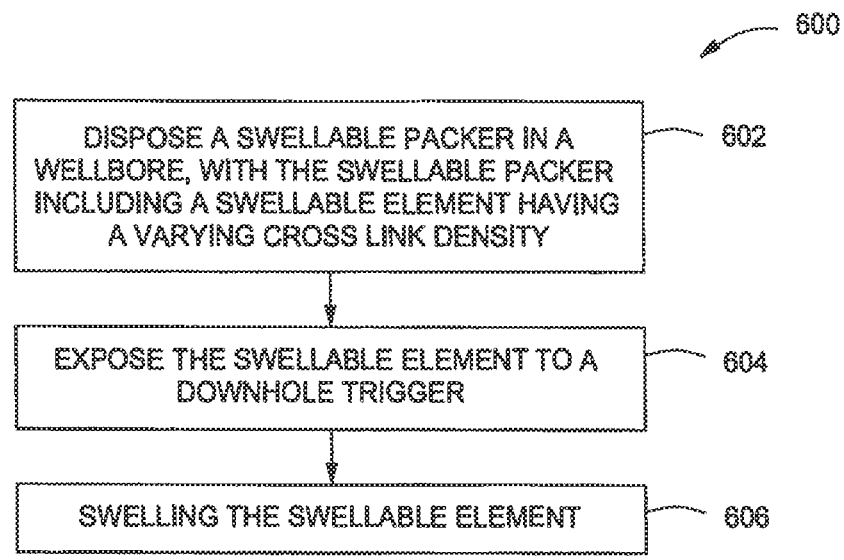
FIG. 6 depicts a flow chart of an exemplary method of sealing an annulus of a wellbore, according to one or more embodiments described.

FIG. 6 depicts a flow chart of an exemplary method 600 of sealing an annulus of a wellbore. The method 600 may include disposing a swellable packer in the wellbore, as at 602. In an exemplary embodiment, the swellable packer can include a swellable element having varying cross link density, as described above with reference to FIGS. 1 and 2. The cross link density can vary along a thickness of the swellable element, an azimuth thereof, or both. The method 600 can also include exposing the swellable element to a downhole trigger, as at 604. Exemplary downhole triggers can include heat, pH, etc., as described above with reference to FIG. 1. The method 600 can also include swelling the swellable element, as at 606. Swelling the swellable element with the varying cross link density can allow the swellable element to form to any irregularities in the wellbore. This can provide a tight seal, for example, a hermetic seal, within the wellbore.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method comprising:
    wrapping at least one sheet of an elastomeric material about a mandrel to form a swellable element of a swellable packer; and
    curing the at least one sheet to vary a cross link density along a thickness of the swellable element, the curing comprising:
    applying thermal energy to the at least one sheet during first time intervals to raise a temperature of the at least one sheet; and
        in at least one second time interval that intervenes between two of the first time intervals, cooling the at least one sheet.

2. The method of claim 1, wherein curing further comprises:
- exposing the at least one sheet to a predetermined temperature during a heating period;
- cooling the at least one sheet of elastomeric material during a cooling period subsequent to the heating period; and
- repeating exposing the at least one sheet to the predetermined temperature and cooling the at least one sheet at least one additional time.

3. The method of claim 2, wherein the cooling period is approximately 2.5 to 5 times longer than the heating period.

4. The method of claim 2, wherein the heating period comprises a period of approximately two minutes and the cooling period comprises a period of approximately five to ten minutes.

5. The method of claim 2, wherein exposing the at least one sheet comprises exposing the at least one sheet to a relatively constant temperature source during the heating period.

6. The method of claim 1, wherein curing the at least one sheet further comprises regulating the curing to control an azimuthal variation of a cross link density.

7. A method to form a swellable packer to be used in a well, the method comprising:
- wrapping a first elastomeric material layer about a tubular member;
- wrapping a second elastomeric material layer about the first elastomeric material layer;
- wrapping a third elastomeric material layer about the second elastomeric material layer; and
- varying cross link densities associated with the first, second and third elastomeric material layers to vary an effective cross link density of the swellable packer along a radial thickness of the packer.

8. The method of claim 7, wherein the first, second and third elastomeric material layers are spatially ordered according to a layer number index, and varying cross link densities associated with the first, second and third elastomeric material layers comprises varying an associated cross link densities according to a nonlinear function of the layer number index.

9. The method of claim 7, wherein varying cross link densities associated with the first, second and third elastomeric material layers further comprises varying associated cross link densities of the first, second and third elastomeric material layers according to the cross link density associated with the first elastomeric material layer.

10. The method of claim 7, wherein varying cross link densities associated with the first, second and third elastomeric material layers comprises varying cross link densities associated with the first, second and third elastomeric material layers according to a linear function.

11. The method of claim 7, wherein varying cross link densities associated with the first, second and third elastomeric material layers comprises chaotically varying cross link densities associated with the first, second and third elastomeric material layers.

12. The method of claim 7, further comprising varying at least one of the cross link densities associated with the first, second and third elastomeric material layers azimuthally to vary an effective cross link density of the swellable packer azimuthally about an axis of the tubular member.

13. The method of claim 7, wherein varying the cross link densities associated with the first, second and third elastomeric material layers comprises varying a composition of a cross linking agent associated with each of the first, second and third elastomeric material layers.

14. The method of claim 7, wherein varying the cross link densities associated with the first, second and third elastomeric material layers comprises varying a concentration of a cross linking agent associated with each of the first, second and third elastomeric material layers.

15. The method of claim 7, wherein varying the cross link densities associated with the first, second and third elastomeric material layers comprises, for at least one of the first, second and third elastomeric material layers comprises selectively blending granules of a cross linking agent with an uncured elastomeric material.

16. A method comprising:
- applying thermal energy to a swellable material of a swellable packer to cure the swellable material; and
- regulating a time profile of the applying to cause a cross link density of the swellable material to vary with a thickness of the swellable material.

17. The method of claim 16, wherein regulating the time profile comprises applying pulses of thermal energy to the swellable material.

18. The method of claim 16, wherein regulating the time profile comprises applying a transient heating profile to the swellable material.

19. The method of claim 16, wherein the thickness comprises a radial thickness.

20. The method of claim 16, wherein applying the thermal energy comprises applying the thermal energy to a plurality of layers.

* * * * *